United States Patent [19]
Bedford

[11] Patent Number: 5,642,683
[45] Date of Patent: Jul. 1, 1997

[54] PARACHUTE-TYPE SAIL FOR BOATS

[76] Inventor: Norman Bedford, 6801 W. Dry Creek Rd., Healdsburg, Calif. 95447

[21] Appl. No.: 635,413

[22] Filed: Apr. 26, 1996

[51] Int. Cl.$^6$ ................................................. B63H 9/04
[52] U.S. Cl. ........................ 114/103; 114/39.1; 244/145
[58] Field of Search ................................. 114/39.1, 102, 114/103, 105; 244/145

[56] References Cited

U.S. PATENT DOCUMENTS 3,104,855  9/1963  Barish ............................ 244/142

FOREIGN PATENT DOCUMENTS 2541964  9/1984  France ............................ 114/103
1341100  9/1987  U.S.S.R. ............................ 114/103

*Primary Examiner*—Jesus D. Sotelo
*Attorney, Agent, or Firm*—Klein & Szekeres, LLP

[57] ABSTRACT

A parachute-type sail is connected with a tethering line to a water going vessel to provide motive power for the vessel. At least one swivel is disposed on the tether line between the vessel and the sail that allows the sail to roll when the vessel moves and the sail is in contact with the water's surface. The tether line may be raised or lowered relative to the horizon and may be moved around the compass to optimize position of the sail and thereby minimize the overturning vector and optimize the thrust balance for movement with neutral or substantially neutral rudder.

15 Claims, 7 Drawing Sheets

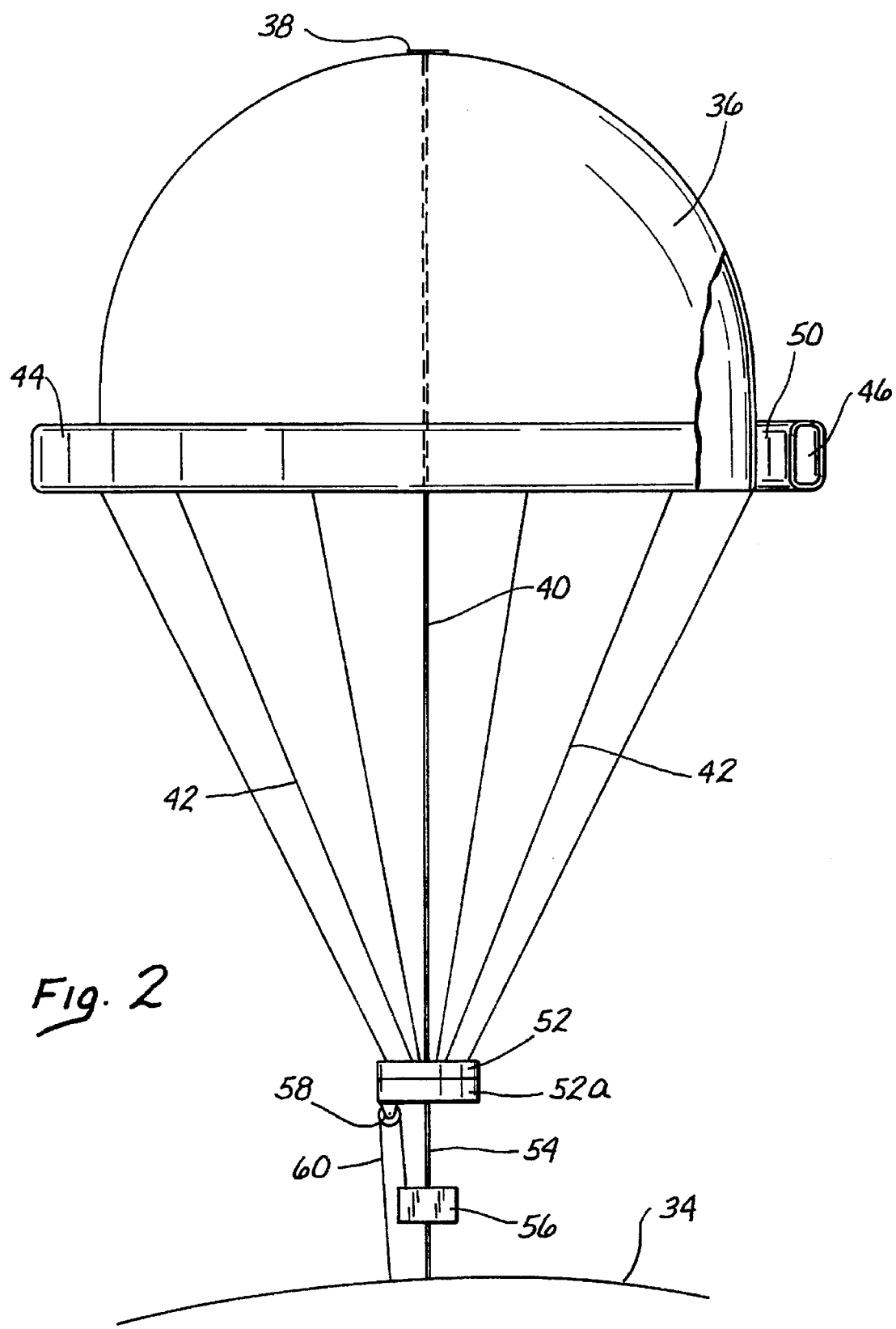

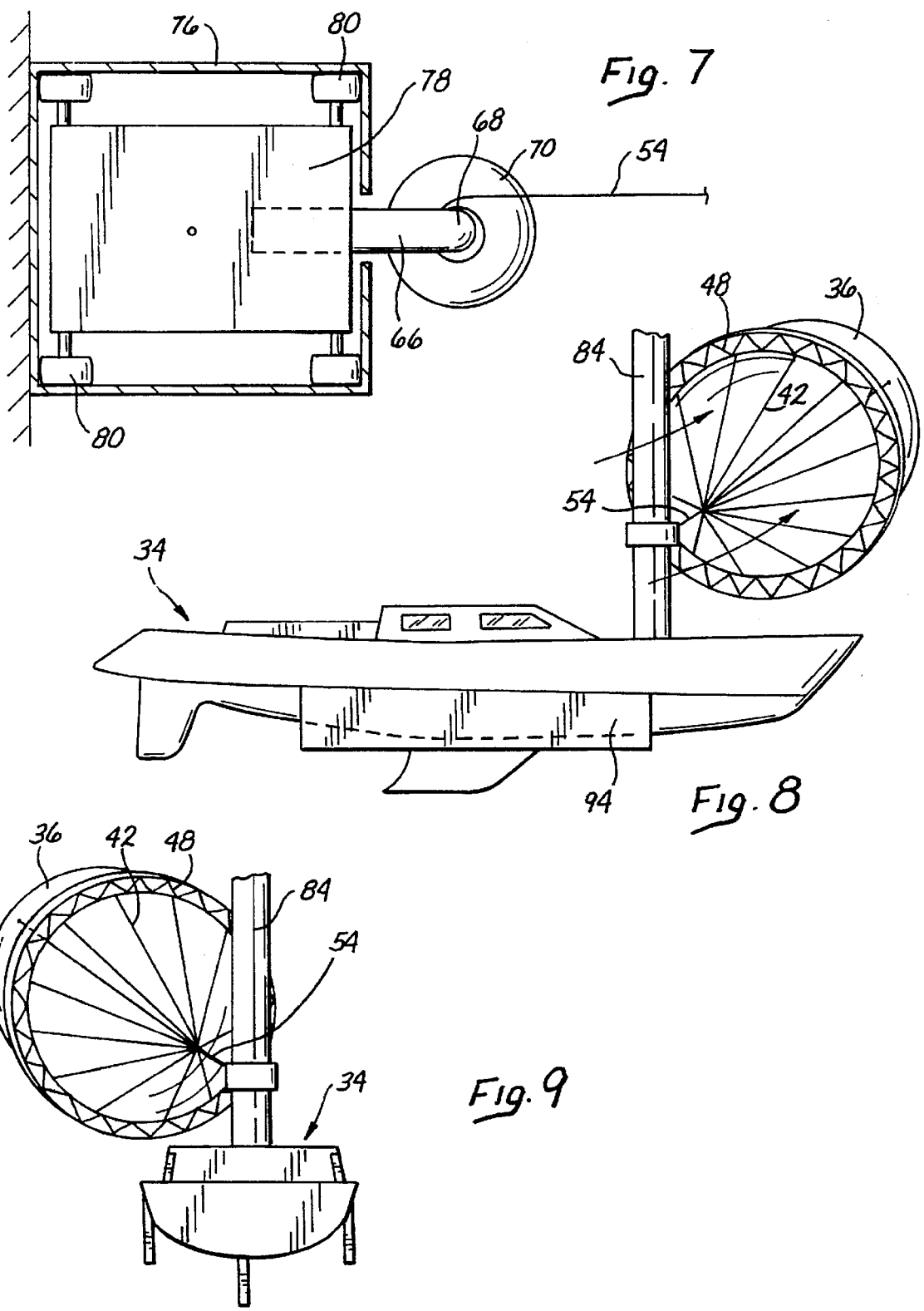

PARACHUTE-TYPE SAIL FOR BOATS

BACKGROUND OF THE INVENTION

1. Field of the Invention

The present invention is directed to a parachute-type sail for boats. The present invention is also directed to a boat which is adapted to be driven by a parachute-type sail.

2. Background of the Invention

Sailboats, sails, winches, capstans and numerous articles of equipment related to the art of sailing are old in the art. It is also known that in modern times the art of sailing has been practiced more for pleasure or hobby than for the purpose of transportation of goods or persons across great bodies of water. Nevertheless, in addition to its recreational value, capturing and using the energy of the wind by deploying sails on a boat can still result in significant saving of fossil fuels and money, even in boats which are equipped with gasoline or diesel engines. Many small pleasure boats which are primarily motor boats, however, are not equipped with sails. Moreover, many persons who travel in motorboats for pleasure or in pursuit of other activities, such as fishing, are not competent to handle the rather sophisticated art of sailing with traditional sailing equipment. Therefore, there is room in the art for non-traditional, easily deployable and maneuverable sailing equipment for boats, for the purposes of pleasure as well as for saving of fuel or providing additional motive power to a water going vessel. The present invention provides such non-traditional sailing equipment.

SUMMARY OF THE INVENTION

It is an object of the present invention to provide non-traditional sailing equipment for boats, including motor boats, which can provide primary or auxiliary motive power to the boat.

It is another object of the present invention to provide non-traditional sailing equipment for boats which meets the foregoing objective and which is relatively easy to maneuver and deploy.

The foregoing objects and advantages are attained by a parachute-type sail that is attached to the boat with a tether and which is free to rotate relative to the boat on a substantially horizontal or near horizontal axis. When the parachute sail is in use it is likely to be in contact with the surface of the water and roll about the horizontal or near horizontal axis. The position of the parachute sail around the compass relative to the boat is controlled from the boat thereby influencing the speed and direction of travel of the boat.

The features of the present invention can be best understood together with further objects and advantages by reference to the following description, taken in connection with the accompanying drawings, wherein like numerals indicate like parts.

BRIEF DESCRIPTION OF THE DRAWINGS

FIG. 2 is a schematic side view of the parachute-type sail of the first embodiment;

FIG. 7 is a schematic enlarged cross-sectional view of a fourth preferred embodiment, the cross-section being analogous to the one taken on lines 6,6 of FIG. 4;

FIG. 8 is a schematic perspective view of a fifth preferred embodiment of the boat-parachute-type sail combination of the present invention;

FIG. 9 is a schematic rear view of the fifth preferred embodiment;

DESCRIPTION OF THE PREFERRED EMBODIMENTS

The following specification taken in conjunction with the drawings sets forth the preferred embodiments of the present invention. The embodiments of the invention disclosed herein are the best modes contemplated by the inventor for carrying out his invention, although it should be understood that various modifications can be accomplished within the parameters of the present invention.

Figure 1:
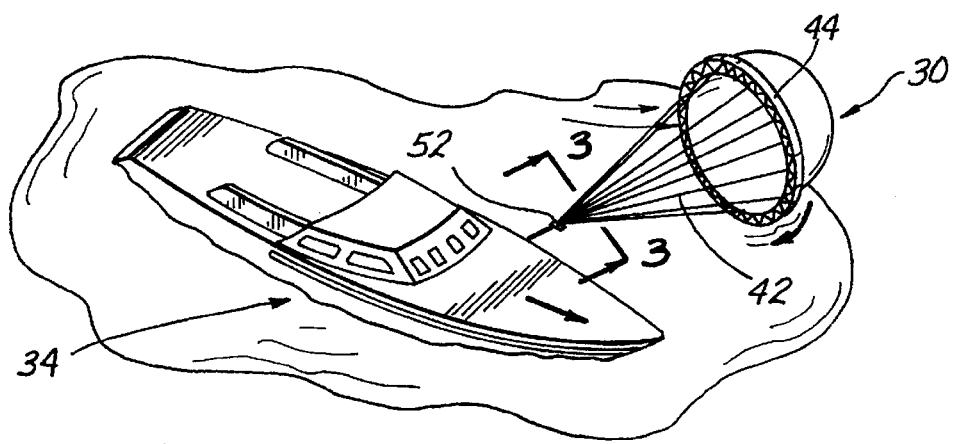
FIG. 1 is a schematic perspective view of the first preferred embodiment of the boat-parachute-type sail combination of the present invention.

Referring now to the drawing figures and particularly to the perspective view of FIG. 1, a first preferred embodiment of the boat-parachute-type sail combination of the present invention is disclosed. It should be noted at the outset that the parachute-type sail of the present invention is primarily adapted for use in conjunction with pleasure boats, and among these primarily with motorboats of the type which, up to the present invention, had no sail. The foregoing however does not represent a limitation to the present invention, because the parachute type sail of the invention can be adapted to provide motive power to boats of virtually any size. Therefore, the size and particular type of boat which is illustrated on the drawing figures and is described in connection with the specific examples should be considered exemplary rather than limiting in nature. Moreover, because boats per se are well known in the art, the boats described in connection with the preferred embodiments are illustrated only schematically, with emphasis on the features which comprise or are associated with the present invention.

Figure 3:
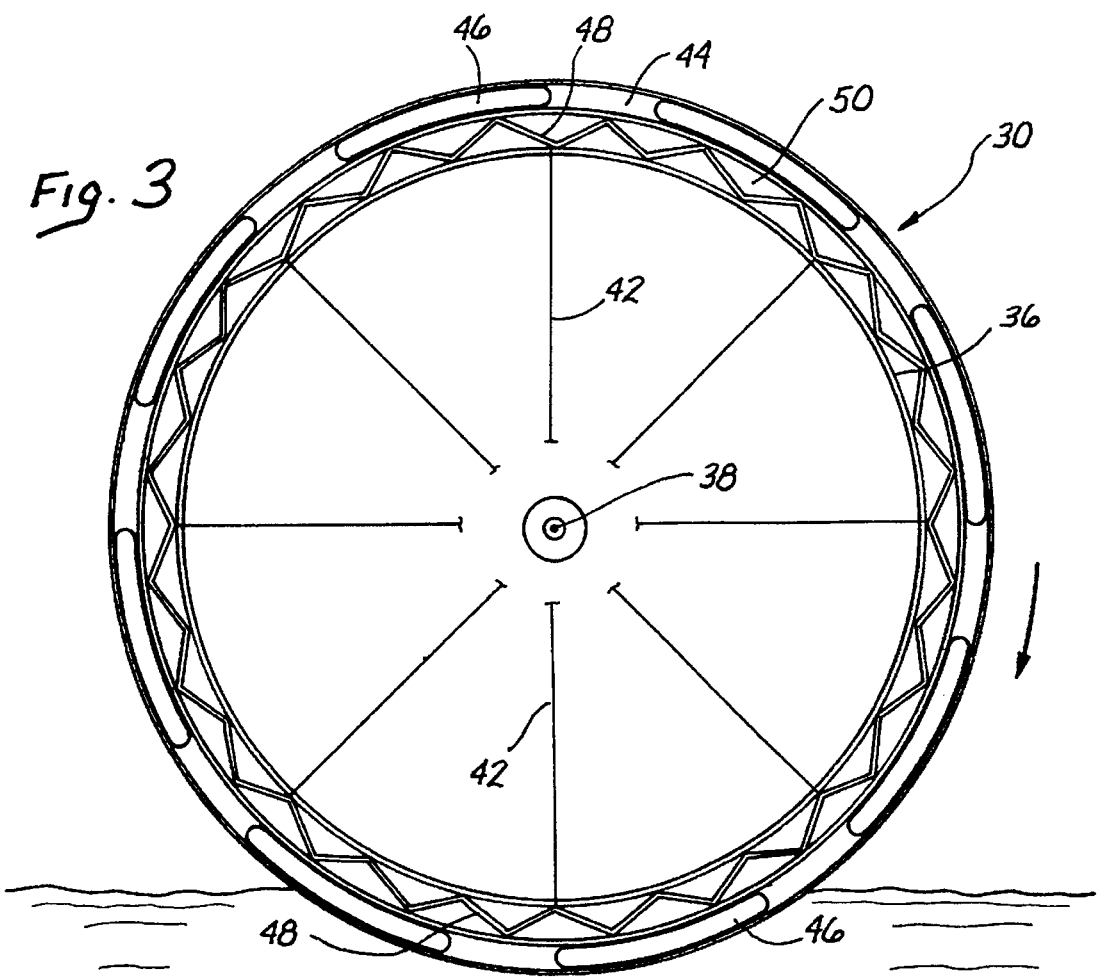
FIG. 3 is a cross-sectional view taken on lines 3,3 of FIG. 1.

Referring now back again to FIG. 1, a parachute-type sail 30 is connected with a tether line to the boat 34. The parachute type sail 30 includes a canopy 36. The canopy 36 can be made from materials such as carbon fiber cloth, Dacron, other synthetic fabrics, silk and such other materials which are presently used in the state-of-the-art in parachutes and/or in the manufacture of conventional sails. However, carbon fiber cloth is presently preferred for the material of the canopy 36. A swivel 38 is attached to the top center of the canopy 36, and a line or cable 40 is affixed to the swivel 38. Because the swivel 38 is of conventional construction it is shown only schematically in the drawing figures. A plurality of shroud lines 42 are attached to the canopy 36 around its circumference, substantially in the manner as it is conventionally done in parachutes. A ring 44 surrounds the lower periphery of the canopy 36, as is best shown in FIGS. 1, 2, and 3. The ring 44 can be made from the same kind of fabric as the canopy 36, with carbon fiber cloth being presently preferred. As it can be seen in FIGS. 2 and 3, the fabric of the ring 44 is sewn or otherwise affixed in such a way so as to form a hollow interior, into which a plurality of flotation chambers 46 are incorporated by conventional means, such as sewing. Each of the flotation chambers 46 comprises a hollow inflatable body, the walls being formed of rubber or synthetic material (such as polypropylene, carbon fiber, or polyvinyl chloride). Alternatively, the flotation chambers 46 can be made from buoyant synthetic foam material. The flotation chambers 46 provide a degree of rigidity to the ring 44. The ring 44 is attached to the lower periphery of the canopy 36 by lines 48 which are either sewn or tied to grommets (not shown) present in the ring 44 and in the canopy 36. The cable 40, shroud lines 42 and the lines 48 attaching the ring 44 to the canopy 36 are made from materials used in state-of-the-art sailing equipment or state-of-the-art parachuting equipment. As it can be seen in the drawing figures, an air gap 50 is disposed between the canopy 36 and the ring 44.

It should be already apparent from the foregoing description and inspection of the drawing figures that wind inflates the parachute-type sail 30 and provides a force which propels the boat 34 to which the parachute-type sail 30 is attached. While the parachute-type sail 30 of the present invention is inflated and propels the boat 34 it is likely to be in a substantially horizontal, or near horizontal position, as is schematically shown in FIG. 1. The direction of travel of the boat 34 is at an angle to the axis of the parachute sail 30 represented in the drawing figures by the taut main line or cable 40. The buoyancy provided by the flotation chambers 46 in the ring 44 helps the parachute-type sail 30 to stay above the surface of the water, and keeps the sail 30 from sinking when it is initially deployed or after it is collapsed and falls to the water's surface. The air gap 50 helps to smoothen the air flow and make it less turbulent as it spills out of the canopy 36 and travels down the curved outer surface of the canopy 36. As a result the air gap 50 increases the effective force of the wind on the sail 30.

Figure 12:
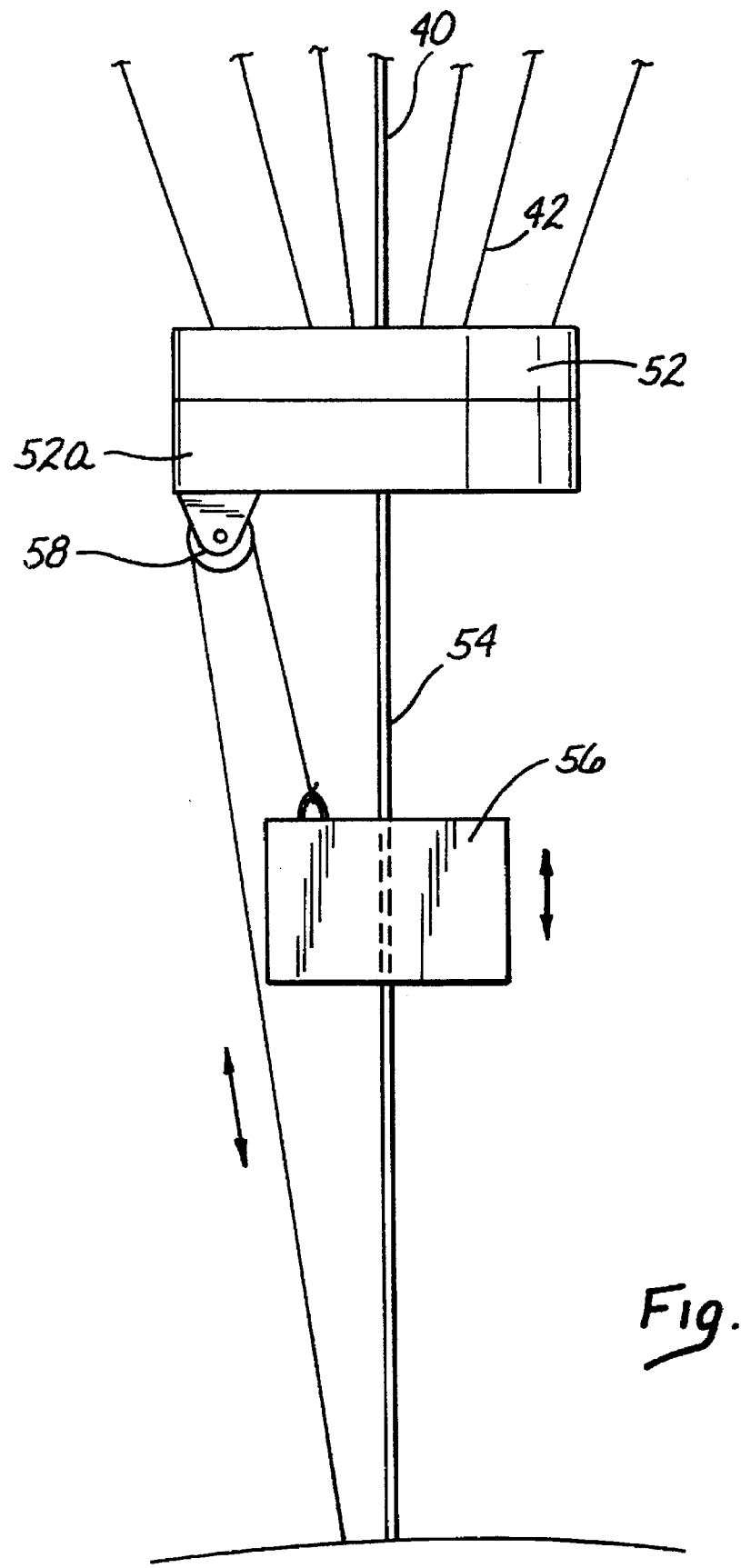
FIG. 12 is a schematic enlarged partial view of the first preferred embodiment.

Because the parachute-type sail 30 is likely to roll when it comes into contact with the water it is necessary to avoid a "winding up" of the line or cable 40 and of the shroud lines 42. This is accomplished by the freely rotating swivel 38 to which one end of the cable 40 is attached, and by a second swivel 52 to which the shroud lines and the other end of the cable 40 is attached. The second swivel 52, in the proximity of the boat 34 is itself attached to the boat 34 with a line or cable 54. A weight 56 is movably mounted on the line 54 in such a manner that the weight 56 can be shifted in its position on the line 54 between the swivel 52 and the boat 34. This is best shown in FIGS. 2 and 12. As it should be apparent to those skilled in the art in view of the foregoing description the location of the weight 56 on the line 54 effects the elevation of the parachute-type sail 30 relative to the boat 34 and water; the further removed is the weight 56 from the boat 34 the closer is the sail 30 to the water's surface. The location of the weight 56 on the line 54 can be controlled in a variety of manner from the boat 34; for example the weight 56 may be manually shifted on the line 54 where it may be held in position by friction. FIGS. 2 and 12 show the presently preferred manner of controlling the location of the weight 56 on the line 54; a pulley 58 or equivalent mechanical device is attached to the non-rotating part 52a of the swivel 52 and a line 60 is disposed through the pulley 58 connecting the weight 56 and a winch (not shown) or the like. The winch (not shown) may be mounted on the side or within the interior of the boat 34. It should be apparent from the foregoing that shortening the line 60 for example by manipulating the winch (not shown) by an operator in the boat 34 moves the weight 56 away from the boat 34 and lowers the position of the sail 30 relative to the horizon. Lengthening the line 60 has the opposite effect. It will be readily understood by those skilled in the art of sailing and sail boat construction and design that the direction and speed of travel of a sail boat is influenced by several factors, which include the shape and dimensions of the wetted surface of the boat, the direction of the wind, position of the sail or sails and position of the boat's rudder or other steering device. One of these factors which can be influenced or controlled as a novel feature of the present invention is the position of the sail 30 relative to the hull of the boat 34. This is accomplished by varying the place of attachment of the tethering line to the hull.

Figure 4:
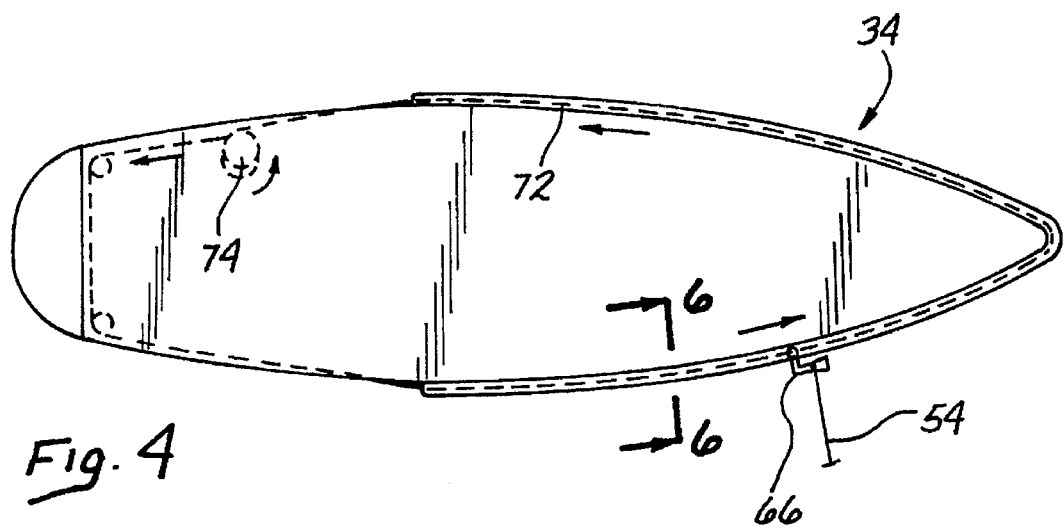
FIG. 4 is a schematic top partial view of the second preferred embodiment of the boat-parachute-type sail combination of the present invention.
Figure 5:
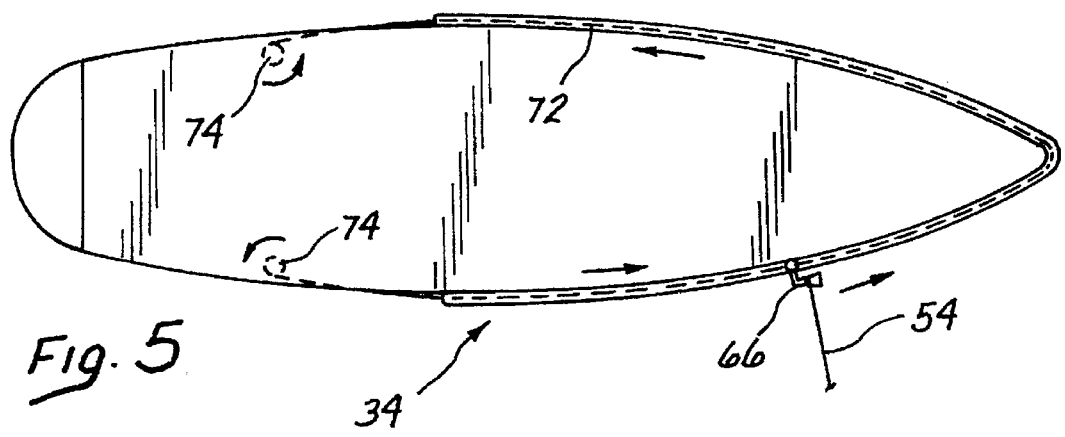
FIG. 5 is a schematic top partial view of the third preferred embodiment of the boat-parachute-type sail combination of the present invention.
Figure 6:
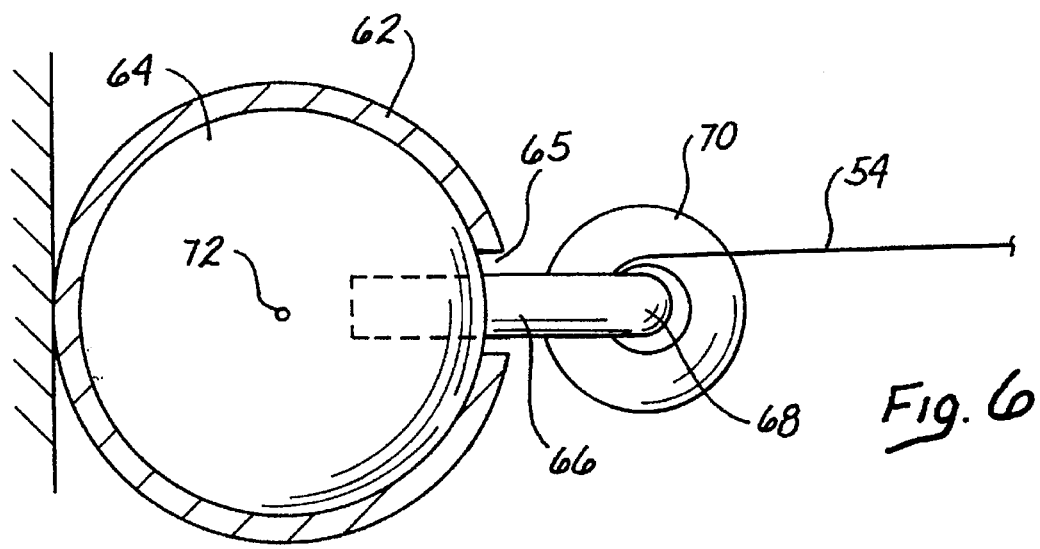
FIG. 6 is a schematic enlarged cross-sectional view taken on lines 6,6 of FIG. 4.

FIG. 6 shows a pipe or conduit 62 of substantially circular cross-section, which is attached to the hull of the boat 34 on the exterior of the boat 34, and which extends either around substantially the entire periphery of the boat 34 as shown in FIG. 4, or around part of the periphery, as shown in FIG. 5. A ball or carriage 64 is disposed within the conduit 62. A substantially horizontally disposed slot 65 is located in the conduit 62. A bar or post 66 with an elbow 68 and a ball or conical knob 70 at its end is attached to the ball 64 in the conduit 62 and protrudes from it through the slot 65. The cable or line 54 which tethers the sail 30 is attached to the bar 66 below the knob 70. The purpose of the knob 70 is to keep the line 54 from being pulled off the bar 66 by the force of the sail 30 or while the sail 30 is deployed or retrieved.

Still another cable 72 is located inside the conduit 62 and is affixed to the ball or carriage 64. In accordance with the second preferred embodiment schematically shown in FIG. 4, the cable 72 forms a continuous loop which is wound on a winch 74 which could be located in the interior of the boat 34. It follows from the foregoing that turning of the winch 74 moves the ball 64 within the conduit 62 and therefore moves the tethered sail 30 to substantially any desired location on the periphery of the boat 34. FIG. 5 discloses a third preferred embodiment of the invention, where each end of the cable 72 is wound on a winch 74. The two winches 74 are turned in opposite directions to move the tethered sail 30 around the periphery of the boat 34.

FIG. 7 discloses a fourth preferred embodiment of the invention. This embodiment differs from the embodiment shown in FIG. 6 in that a conduit 76 which is disposed around the periphery on the exterior of the boat 34 is not circular, but rather rectangular in cross section. A carriage 78 supported by wheels 80 is disposed within the carriage 78. The carriage 78 is affixed to the bar or post 66 with an elbow 68 to which the tethering cable 54 is tied.

Figure 10:
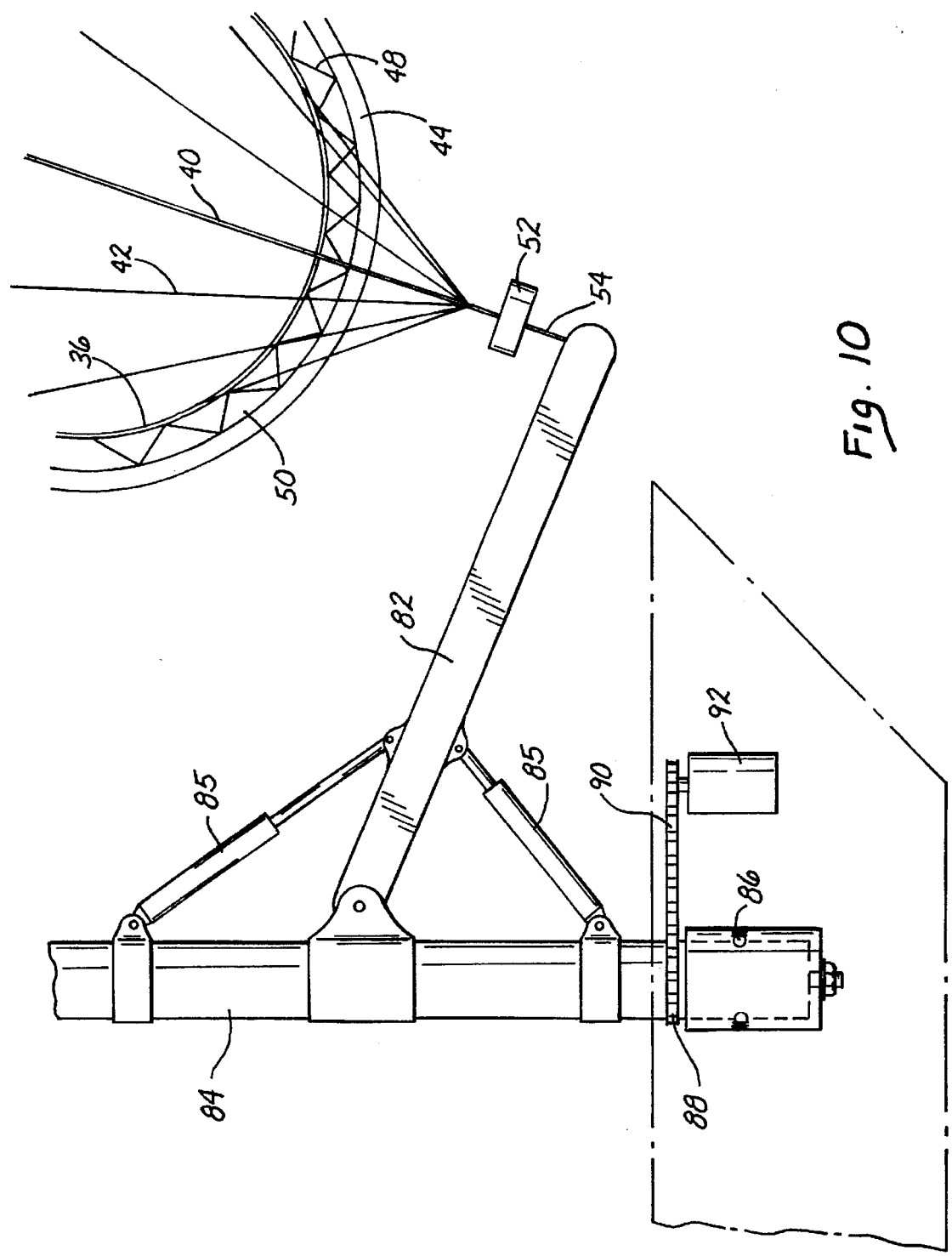
FIG. 10 is a schematic enlarged partial view of the fifth preferred embodiment.

FIGS. 8, 9 and 10 disclose a fifth preferred embodiment of the present invention. In this embodiment the tethering cable 54 is attached to a bar or arm 82 that is mounted to a mast or post 84 on the boat 34. A swivel 52 that allows rolling of the sail 30 on the water without winding up the main cable 40 or the shroud lines 42, is interposed between the two cables 40 and 54. This is shown in FIG. 10. The arm 82 is mounted to the mast 84 to pivot on a horizontal axis relative to the mast 84. Two hydraulically or electrically actuable pistons 85 raise or lower, and hold the arm 82 steady in position relative to the horizon. The mast 84 is mounted into the boat 34 on a bearing 86 that allows the mast 84 to pivot about a vertical axis. A gear or sprocket 88 is affixed to the mast 84 and a chain 90 engages the sprockets 88. The chain 90 is also engaged by an electrically driven stepping motor 92, whereby the mast 84 can be pivoted about the vertical axis in small increments. Therefore, the position of the arm 82 around the compass can be controlled by the operator of the boat 34.

In light of the foregoing, in all embodiments of the invention, the operator/sailor is able to adjust the elevation of the sail 30 above the water level to best suit the conditions under which the boat 34 is sailing. In the first, second, third and fourth embodiments this adjustment of elevation is accomplished by adjusting the position of the trim weight 56. In the fifth preferred embodiment it is accomplished by raising or lowering the arm 82. The ability to rotate the arm 82 about the compass as in the fifth preferred embodiment, and the ability to adjust the position of the tether on the periphery of the boat 34 enables the operator/sailor (not shown) to balance the thrust vector acting on the boat 34 while maintaining neutral or substantially neutral rudder 92. FIGS. 8 and 9 also show thrust boards 94 attached to the hull below the water line, which may be provided optionally on the boat of the fifth embodiment. The parachute sail 30 may be collapsed, (and thereafter retrieved) by allowing substantial slack to develop on the line 54, for example by allowing the line 54 to unravel rapidly from a reel (not shown) placed on the bar 66. Conversely, when it is desired to deploy the parachute sail 30, it is first placed overboard from the vessel, secured at two points until filled by the wind and the line 54 is allowed to unravel slowly while the wind keeps the sail 30 inflated and the line taut.

Figure 11:
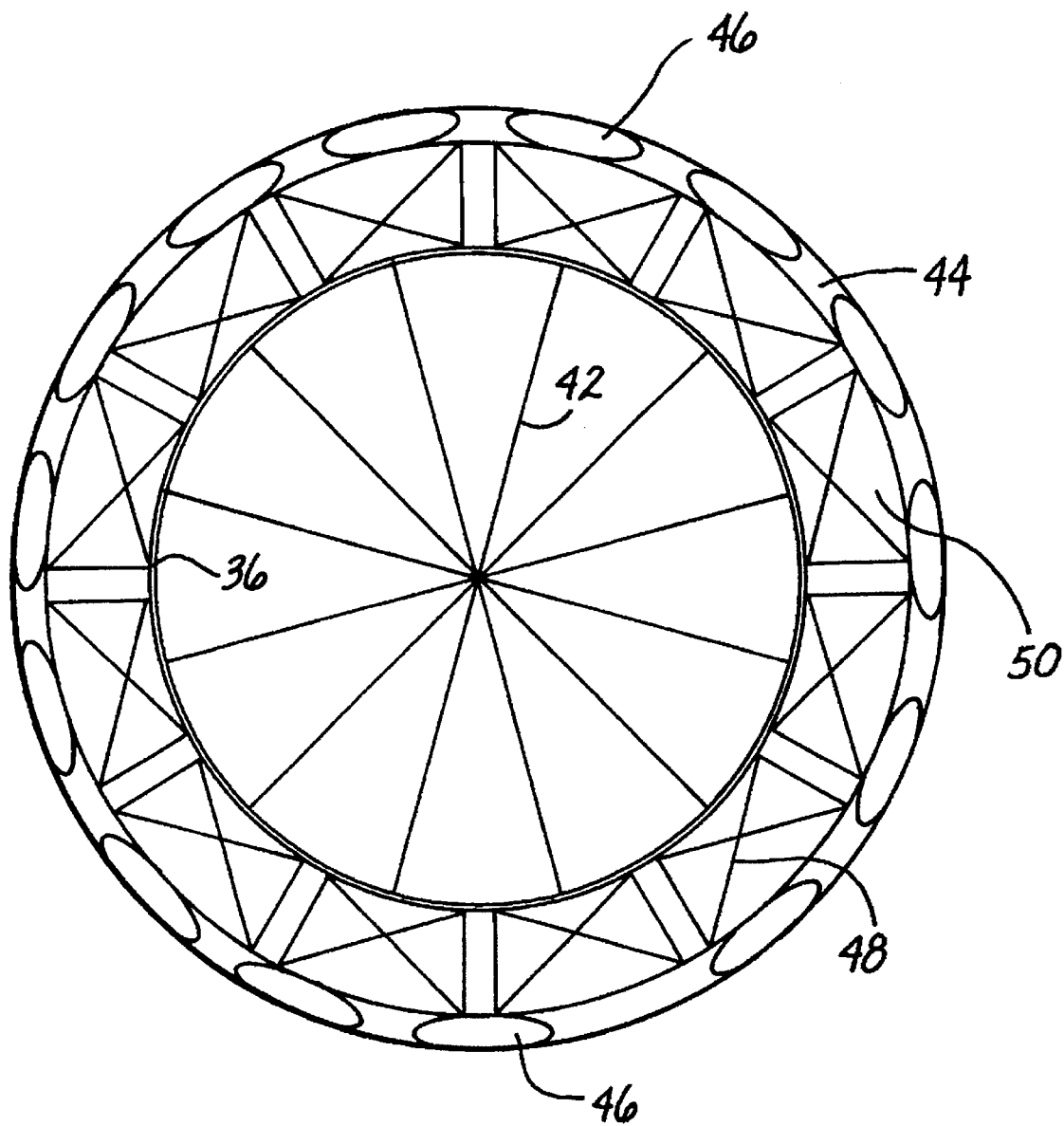
FIG. 11 is a bottom view of the sail of a sixth preferred embodiment.

FIG. 11 discloses the bottom view of the parachute-type sail of a sixth preferred embodiment.

Several modifications of the present invention may become readily apparent to those skilled in the art in light of the foregoing disclosure. Therefore, the scope of the present invention should be interpreted solely from the following claims, as such claims are read in light of the disclosure.

What is claimed is:

1. In combination a water going vessel and a sail comprising:
    a water going vessel;
    a parachute-type sail that includes a canopy;
    a line tethering the parachute type sail to the vessel, said line being affixed to a location substantially on the periphery of the vessel;
    swivel means operatively connected to the line for allowing rotation of the sail relative to the line without winding up the line, and
    means for moving the location to which the tethering line is affixed about the periphery of the vessel, at the option of an operator.

2. A water going vessel and sail combination in accordance with claim 1 wherein the means for moving comprises a conduit disposed substantially parallel with the periphery of the vessel, the tethering line is affixed to a member that is movable along the conduit, and means for moving the member along the conduit.

3. A water going vessel and sail combination in accordance with claim 2 wherein the means for moving the member comprises a cable and at least one winch on which the cable is partially wound.

4. In combination a water going vessel and a sail comprising:
    a water going vessel;
    a parachute-type sail that includes a canopy;
    a line tethering the parachute type sail to the vessel,
    an arm attached to the vessel, the line that tethers the sail to the vessel being affixed to the arm, and means for raising and lowering the arm relative to the horizontal direction and means for rotating the arm about the compass.

5. In combination a water going vessel and a sail comprising:
    a water going vessel;
    a parachute-type sail that includes a canopy;
    a line tethering the parachute type sail to the vessel, the parachute-type sail further including a ring that surrounds the canopy at the lower periphery thereof, an air gap being located between the ring and the canopy and the ring includes a plurality of members that provide buoyancy to the ring.

6. A water going vessel and sail combination in accordance with claim 5 wherein the plurality of members provide sufficient buoyancy to render the parachute-type sail lighter than water.

7. A water going vessel and sail combination in accordance with claim 6 wherein the plurality of members providing buoyancy comprise a plurality of enclosed hollow air-filled bodies.

8. In combination a water going vessel and a sail comprising:
    a water going vessel;
    a sail that comprises a parachute-type canopy having a first cable attached to the center of the canopy and a plurality of shroud lines attached to the lower periphery of the canopy, the sail further comprising a ring disposed around and attached to the lower periphery of the canopy, an air gap being located between the canopy and the ring;
    a second cable attached to the water going vessel;
    swivel means attached to the first cable and the shroud lines, and to the second cable for allowing rotation of the first cable, shroud lines and parachute relative to the second cable, and
    means for raising and lowering the position of the sail relative to the horizontal direction when the vessel moves on the water driven by the sail.

9. A water going vessel and sail combination in accordance with claim 8 wherein the means for raising and lowering comprise a weight movably located on the second cable.

10. A water going vessel and sail combination in accordance with claim 9 wherein the second cable that attaches the sail to the vessel is affixed to an arm attached to the vessel, and wherein the combination further comprises means for raising and lowering the arm relative to the horizontal direction and means for rotating the arm about the compass.

11. A water going vessel and sail combination in accordance with claim 8 further comprising means for moving the location to which the second cable is affixed about the periphery of the vessel, at the option of an operator.

12. A water going vessel and sail combination in accordance with claim 11 wherein the means for moving comprises a conduit disposed substantially parallel with the periphery of the vessel, the second cable is affixed to a member that is movable along the conduit, and means for moving the member along the conduit.

13. A water going vessel and sail combination in accordance with claim 12 wherein the means for moving the member comprises a third cable and at least one winch on which the third cable is partially wound.

14. A parachute-type sail adapted to be attached to a water going vessel for providing motive power to said vessel, the parachute-type sail comprising:

a canopy;

a first cable attached to the center of the canopy;

a plurality of shroud lines attached to the lower periphery of the canopy;

swivel means attached to the first cable and the shroud lines, said swivel means having means for attaching a second cable, the swivel means being adapted for allowing rotation of the first cable, shroud lines and parachute relative to the second cable, and a ring disposed around and attached to the lower periphery of the canopy, an air gap being located between the canopy and the ring, and wherein the ring includes a plurality of members that provide buoyancy to the ring.

15. A parachute-type sail in accordance with claim 14 wherein the plurality of members provide sufficient buoyancy to render the parachute-type sail lighter than water.

* * * * *